Figure 1:
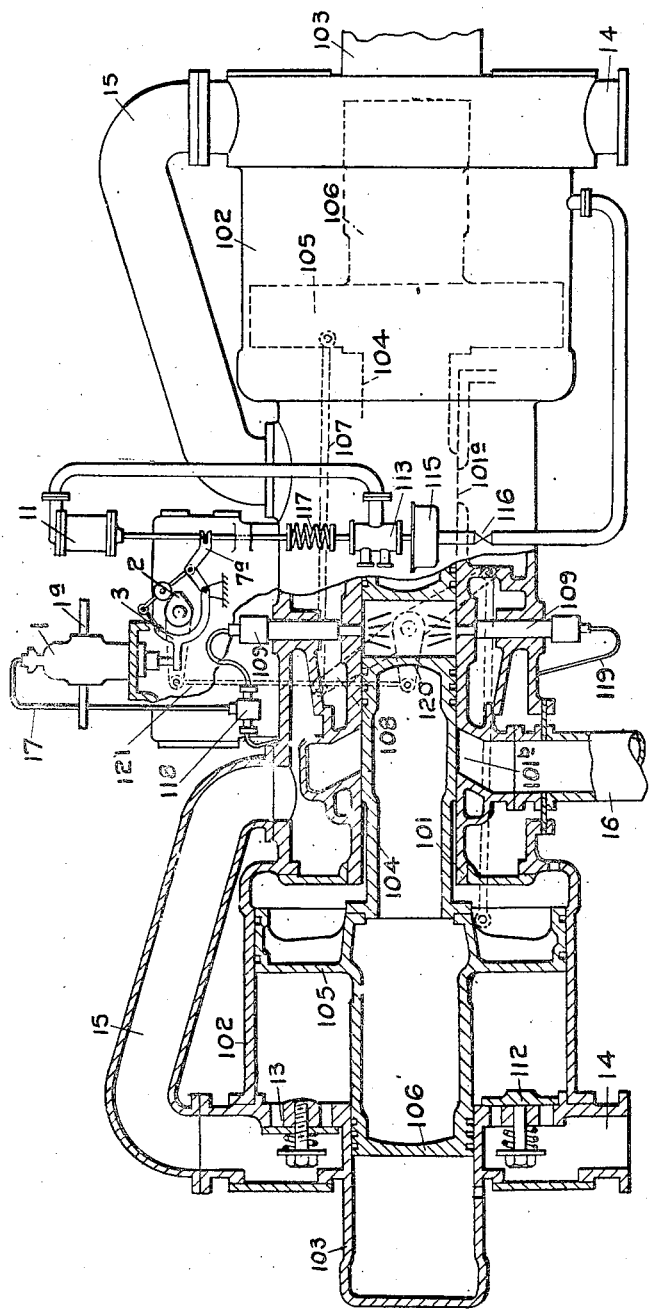

Patented Aug. 29, 1950

2,520,295

UNITED STATES PATENT OFFICE 2,520,295

CONTROL OF FREE PISTON TYPE INTERNAL-COMBUSTION COMPRESSORS

Robert James Welsh, Rugby, England, and René Harold Block, Zurich, Switzerland, assignors to The English Electric Company Limited, London, England, a British company Application December 9, 1947, Serial No. 790,546
In Great Britain October 12, 1942

Section 1, Public Law 690, August 8, 1946
Patent expires October 12, 1962

3 Claims. (Cl. 123—46)

This invention relates to a free piston type internal combustion compressor—i. e. a device wherein a compressor piston is directly connected to or combined with an internal combustion engine piston instead of being driven thereby through connecting rods, cranks and crankshaft. There are usually two opposed engine pistons reciprocable towards and away from each other in one cylinder; the engine is usually one operating on a two-stroke compression-ignition cycle, some or all of the air from the compressor serving to scavenge and charge the engine cylinder.

A device of this kind may be used as a gas generator to supply motive fluid to another piece of apparatus such as a gas turbine, which may have as its working fluid either (I) solely air coming direct from the compressor or (II) solely the exhaust from the engine cylinder (comprising the products of the combustion in the engine cylinder mixed with the scavenging air supplied to the engine by the compressor) or (III) a mixture of the engine exhaust with air coming direct from the compressor. The second of these three alternatives is most usual.

The stroke of the free piston of a gas generator as defined above is usually variable or at least the innermost point reached by the piston at the end of the compression of the charge in the engine cylinder (which may be called the inner dead centre) usually varies throughout operation. The pressure of the gas delivered by the gas generator has to vary during operation and more particularly where it is used to supply a "consumer" such as a gas turbine the pressure has to vary throughout operation in accordance with variations in the load on the turbine.

According to the present invention the point in the piston stroke at which combustion is initiated during the movement of the free piston towards the inner dead centre is varied automatically substantially in accordance with the average pressure of the air compressed in the compressor cylinder. In the case of a gas generator of the compression-ignition fuel-injection type the point in the stroke at which fuel injection commences is automatically varied—preferably by acting on the fuel injection pump arrangement to vary the point at which the operation of this pump commences. The variation may be substantially in accordance with the mean pressure per cycle in the compressor cylinder, in which case the control arrangement responds to the pressure in a reservoir communicating—through a restricted orifice—with the compressor cylinder; the reservoir may be a cylinder with a biassed piston movable therein or a capsule closed by a pressure-responsive diaphragm. Preferably the air pressure acts through a fluid-pressure relay.

Figure 2:
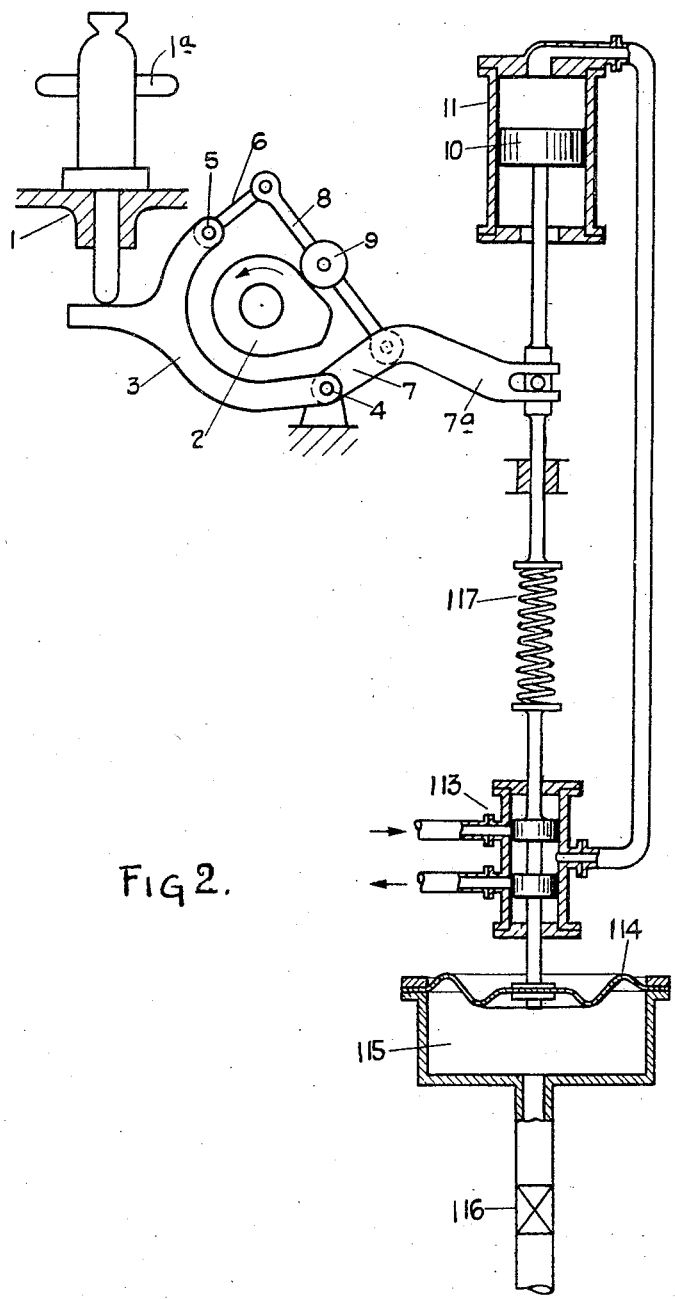

In order to be better understood and readily carried into effect the invention is illustrated by way of example in the accompanying drawings of which Fig. 1 shows a typical free piston internal combustion engine compressor in elevation in part section, and Fig. 2 shows the mechanism according to the invention in section on a larger scale, this mechanism being indicated diagrammatically only in Fig. 1.

Referring first to Fig. 1, the free piston internal combustion engine compressor comprises a combustion cylinder 101, a pair of compressor cylinders 102 and a pair of cushion cylinders 103 arranged in alignment with the combustion cylinder on either side of it, and a pair of free piston assemblies each consisting of an engine piston 104, a compressor piston 105 and a cushion piston 106 adapted to perform opposite reciprocating movements in the said cylinders, being linked by links 107 to a two-armed lever 108 pivoted on the engine body.

Air enters the compressor cylinders 102 through the air inlets 14 and inlet valves 112 and leaves them through outlet valves 13 and transfer ducts 15. The compressed air enters the combustion cylinder 101 as soon as the scavenging ports 101a are cleared by the one of the engine pistons 104, and the combustion products and scavenging air leave the combustion cylinder 101, as soon as the exhaust ports 101b are cleared by the other engine piston 104, via the exhaust pipe 16 leading to a gas turbine (not shown).

Fuel is injected into the combustion cylinder 101 by a fuel pump 1 having the usual fuel control rack 1a, via the pipe 17, the conventional fuel distributor 118 and pipes 119, leading to the fuel injection nozzles 109. The fuel pump 1 is operated in a manner to be described more in detail with reference to Fig. 2, by a cam 2, which is angularly reciprocated by the free piston assemblies by being linked to them by means of the lever 120 and the link 121.

In the particular mechanism shown in Fig. 2, the fuel injection pump 1 is reciprocated by a follower, bearing on cam 2 (the fuel-cam) oscillated by the free piston assembly, which cam itself may be angularly movable with respect to the means by which it is driven from the free piston, but preferably, as shown, the cam follower is angularly movable substantially around the centre of oscillation of the cam; a lever 3 for actuating the pump 1 is mounted on the pivot 4 on one side of the cam 2 and carries a pivot pin 5 on the other side of the cam shaft, the centre lines of the axes of the cam 2 and of the pivot pins 4 and 5 lying on a straight line when the fuel pump is not in motion. A pair of equal cranks 6 and 7 carried respectively by the pivot pins 5 and 4 and having their free ends pivotally connected by a link 8 form a parallel link motion. The cam follower is a roller 9 mounted at such a point on link 8 that on movement of links 6, 7 and 8 relatively to lever 3 the motion of roller 9 is in an arc substantially about the axis of cam 2, the roller 9 riding on the base circle of the cam 2. An extension 7a of crank 7 is connected to the servo-motor piston 10 reciprocable in cylinder 11 and can thereby be rotated to different angular positions to move the roller 9 to various positions angularly around the fuel cam 2.

The fluid supply to the cylinder 11 is controlled by the valve 113. The air pressure acts on a diaphragm 114 in the reservoir 115 communicating with the compressor cylinder through the small orifice 116, which orifice may be regulated by a throttle valve. Movement of the diaphragm is communicated directly to the valve 113 so that a change in air pressure operates the valve 113 in one direction or the other; the resulting movement of the piston 10, which is communicated through the spring 117 to the diaphragm 114 and valve 113, continues until the valve 113 is restored to its normal closed position, the diaphragm 114 being thus also restored to a normal position. In this position the pressure of spring 117 balances the air pressure in the reservoir and the position of the piston 10 corresponds to this latter pressure. The movement of piston 10 will rock the links 6, 7 and 8 about the lever and thereby move the follower 9 around the cam so that the follower is engaged earlier or later by the projecting part of the cam 2 and the initiation of fuel injection is advanced or delayed.

As the free piston assembly reciprocates, the cam 2 oscillates; as the free piston assembly approaches the inner dead centre the cam—at a point dependent on the angular position to which the follower has been moved around the cam—drives the follower 9 thereby bodily moving the follower, the link motion and the lever 3 to actuate the fuel pump 1. This movement and hence the stroke of pump 1 is determined by the dimensions of the cam 2 and is substantially independent of the varying timing of the starting of the pump operation.

It will be understood that the foregoing is given merely as an example of one method of carrying out the invention and that any of various alternative mechanical devices could be used.

What we claim as our invention and desire to secure by Letters Patent is:

1. A free piston internal combustion engine compressor operating on the compression ignition principle, comprising a combustion cylinder and at least one compressor cylinder, at least one engine piston and at least one compressor piston, the said pistons being adapted to reciprocate together as a free piston assembly in the said cylinders at a variable length of stroke, fuel supply means to said combustion cylinder including a fuel pump and a fuel injection nozzle, timing gear operated by the said reciprocating free piston assembly adapted to initiate the combustion of the fuel supplied to the said combustion cylinder and including a cam oscillated by the reciprocating free piston assembly and a cam follower adapted to control the delivery of the said fuel pump, means responsive to the average pressure of the air compressed in the said compressor cylinder and adapted to control the said timing gear by varying the relative angular position of the said cam and the said follower, a cylinder adapted to be connected to fluid pressure, a piston adapted to move in said cylinder under fluid pressure, and a valve adapted to control the admission of fluid to and from the said cylinder, the said valve being controlled by the said air pressure responsive means.

2. A free piston internal combustion engine compressor comprising a combustion cylinder and at least one compressor cylinder, at least one engine piston and at least one compressor piston, the said pistons being adapted to reciprocate together as a free piston assembly in the said cylinders at a variable length of stroke, a fuel injection nozzle for the said combustion cylinder, a cam oscillated by the reciprocating free piston assembly, a cam follower, a fuel injection pump adapted to be operated by the said cam follower to supply fuel to the said injection nozzle, a parallel motion linkage adapted to vary the relative angular position of the said cam follower and the said cam, a cylinder adapted to be connected to fluid pressure, a piston adapted to move in said cylinder under fluid pressure and in operable connection with the said parallel motion linkage, a valve adapted to control the admission of fluid to and from the said cylinder, a resilient spring between said piston and said valve, a chamber comprising a flexible diaphragm adapted to be movable under air pressure and operably connected to the said valve controlling the admission of fluid to and from the said cylinder, a pipe connection between said chamber and said compressor cylinder and a restricted orifice in said pipe connection, the connections between said piston, parallel motion linkage, piston, valve and said diaphragm being arranged in such sense that the point in compression stroke of the said engine piston at which fuel injection commences varies substantially in accordance with the average pressure of the air compressed in the said compressor cylinder.

3. A free piston internal combustion engine compressor as claimed in claim 1 including a chamber, a restricted orifice adapted to connect the said chamber to the compressor cylinder, and a diaphragm adapted to be acted on by the pressure in said chamber and operatively connected with the said valve controlling the admission of fluid to and from the said cylinder.

ROBERT JAMES WELSH.
RENÉ HAROLD BLOCK.

REFERENCES CITED

The following references are of record in the file of this patent:

UNITED STATES PATENTS

| Number | Name | Date |
| --- | --- | --- |
| 2,083,680 | Anderson | June 15, 1937 |
| 2,086,228 | Janicke | July 6, 1937 |
| 2,200,892 | Pateras-Pescara | May 14, 1940 |

FOREIGN PATENTS

| Number | Country | Date |
| --- | --- | --- |
| 427,668 | Great Britain | of 1935 |
| 861,242 | France | of 1940 |